United States Patent
Zeng et al.

(10) Patent No.: US 12,123,836 B2
(45) Date of Patent: Oct. 22, 2024

(54) DETECTION METHOD AND DEVICE BASED ON LASER-INDUCED BREAKDOWN SPECTROSCOPY ENHANCED BY 2D PLASMA GRATING

(71) Applicants: Yunnan Huapu quantum Material Co., Ltd, Yunnan (CN); Chongqing Institute of East China Normal University, Chongqing (CN); East China Normal University, Shanghai (CN); ROI Optoelectronics Technology CO, LTD., Shanghai (CN); Chongqing Huapu Scientific Instrument Co., Ltd., Chongqing (CN); Chongqing Huapu Intelligent Equipment Co., Ltd., Chongqing (CN); GuangDong ROI Optoelectronics Technology Co., Ltd., Guangdong (CN)

(72) Inventors: Heping Zeng, Chongqing (CN); Mengyun Hu, Chongqing (CN)

(73) Assignees: Yunnan Huapu Quantum Material Co., Ltd, Kunming (CN); Chongqing Institute of East China Normal University, Chongqing (CN); East China Normal University, Shanghai (CN); ROI Optoelectronics Technology CO, LTD., Shanghai (CN); Chongqing Huapu Scientific Instrument Co., Ltd., Chongqing (CN); Chongqing Huapu Intelligent Equipment Co., Ltd., Chongqing (CN); GuangDong ROI Optoelectronics Technology Co., Ltd., Dongguan (CN)

( * ) Notice: Subject to any disclaimer, the term of this patent is extended or adjusted under 35 U.S.C. 154(b) by 265 days.

(21) Appl. No.: 17/936,477

(22) Filed: Sep. 29, 2022

(65) Prior Publication Data

US 2023/0094973 A1 Mar. 30, 2023

(30) Foreign Application Priority Data

Sep. 29, 2021 (CN) .......................... 202111149576.0

(51) Int. Cl.
*G01N 21/71* (2006.01)
*G01N 21/01* (2006.01)
*G01N 21/64* (2006.01)

(52) U.S. Cl.
CPC ........... *G01N 21/718* (2013.01); *G01N 21/01* (2013.01); *G01N 21/6402* (2013.01)

(58) Field of Classification Search
CPC ... G01N 21/718; G01N 21/01; G01N 21/6402
See application file for complete search history.

(56) References Cited

U.S. PATENT DOCUMENTS

2023/0093899 A1* 3/2023 Zeng ..................... G01J 3/1809
356/451

FOREIGN PATENT DOCUMENTS

| CN | 109884034 A | 6/2019 |
| CN | 112327397 A | 2/2021 |

OTHER PUBLICATIONS

Jarnac et al., "Study of laser induced plasma grating dynamics in gases", Optics Communications, vol. 312, pp. 35-42 (Year: 2014).*

(Continued)

*Primary Examiner* — Chih-Cheng Kao
(74) *Attorney, Agent, or Firm* — Hodgson Russ LLP

(57) ABSTRACT

A detection method based on laser-induced breakdown spectroscopy enhanced by a two-dimensional plasma grating includes: generating a femtosecond laser pulse by a femtosecond laser, and splitting the femtosecond laser pulse (Continued)

into three sub-pulses by a beam splitting unit; focusing the three sub-pulses separately by a focusing unit to allow focused sub-pulses to be overlapped at an intersection in space, wherein before reaching the intersection, the three sub-pulses form two planes; synchronizing the three sub-pulses in a time domain by adjusting optical paths of the three sub-pulses in such a way that they have the same optical length and the three sub-pulses arrive at the intersection in space simultaneously and form the two-dimensional plasma grating; and exciting a sample on a stage based on the two-dimensional plasma grating to generate a plasma cluster, and acquiring a spectrum of the sample.

18 Claims, 3 Drawing Sheets

(56) References Cited

OTHER PUBLICATIONS

Liu et al., "Control of third harmonic generation by plasma grating generated by two noncollinear IR femtosecond filaments", Optics Express, vol. 20, No. 8, pp. 8837-8847 (Year: 2012).*
CNIPA, First Office Action for CN Application No. 202111149576.0, Apr. 12, 2023.

* cited by examiner

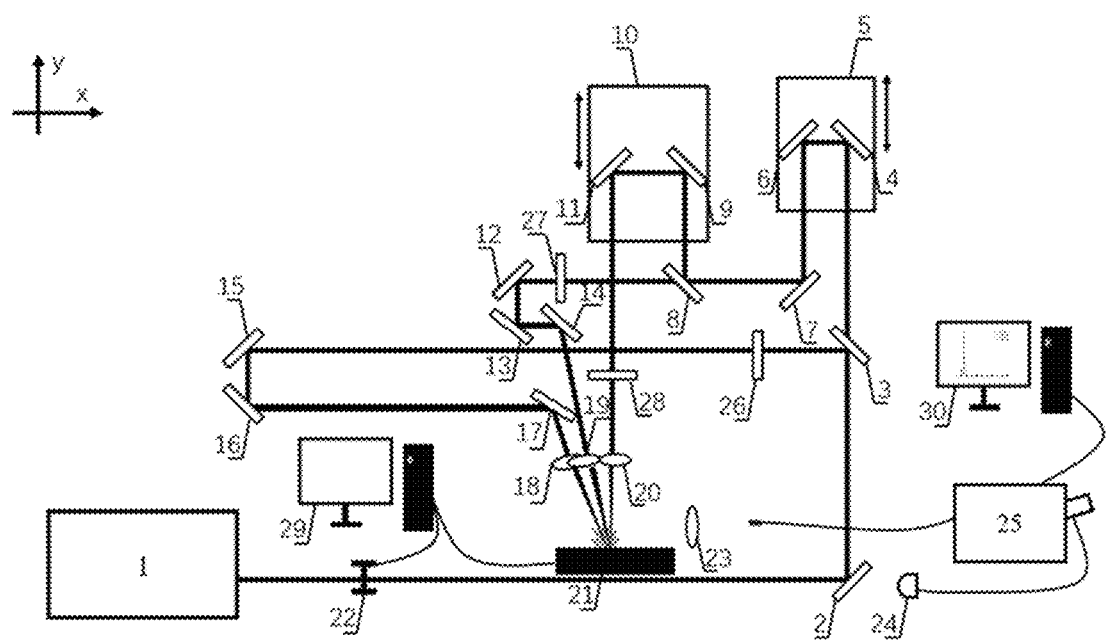
FIG. 1
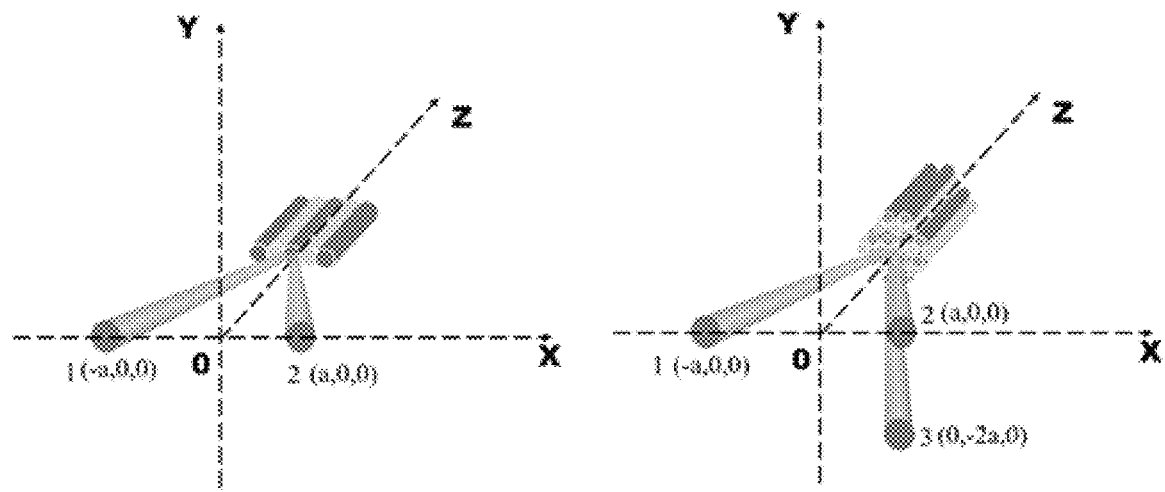
FIG. 2A
FIG. 2B

DETECTION METHOD AND DEVICE BASED ON LASER-INDUCED BREAKDOWN SPECTROSCOPY ENHANCED BY 2D PLASMA GRATING

CROSS-REFERENCE TO RELATED APPLICATION

This application claims priority to and benefits of Chinese Patent Application Serial No. 202111149576.0, filed on Sep. 29, 2021, the entire disclosure of which is incorporated herein by reference.

FIELD

The present disclosure relates to a technical field of spectral detection, and specifically relates to a detection device and method based on laser-induced breakdown spectroscopy enhanced by two-dimensional plasma grating.

BACKGROUND

Laser-induced breakdown spectroscopy (LIBS) is an elemental composition analysis technique used in elemental detection for samples of different applications. With the LIBS, a high-energy and short-pulse-width laser pulse is used as an excitation source and is focused on a sample to generate plasmas. By detecting and analyzing characteristic spectra of the plasmas, elemental composition and element concentration of the sample can be determined. However, the existing LIBS has a low detection sensitivity in practical applications, and has a poor performance when it is used to detect a sample that is difficult to be excited or when it is used to detect trace elements.

Therefore, there is still a need for improving the LIBS to improve the detection sensitivity and achieve an accurate quantitative analysis result.

SUMMARY

In a first aspect of the present disclosure, a detection method based on laser-induced breakdown spectroscopy enhanced by a two-dimensional plasma grating includes: generating a femtosecond laser pulse by a femtosecond laser and splitting the femtosecond laser pulse into three sub-pulses by a beam splitting unit; focusing the three sub-pulses separately by a focusing unit to allow focused sub-pulses to be overlapped at an intersection in space, wherein before reaching the intersection, the three sub-pulses form two planes; synchronizing the three sub-pulses in a time domain by adjusting optical paths of the three sub-pulses in such a way that they have a same optical length and the three sub-pulses arrive at the intersection in space simultaneously and form the two-dimensional plasma grating; and exciting a sample on a stage based on the two-dimensional plasma grating to generate a plasma cluster, and acquiring a spectrum of the sample.

In some embodiments, the detection method further includes adjusting a polarization direction of each sub-pulse to control an interaction degree of the three pulses.

In some embodiments, the detection method further includes moving the stage to allow different parts of the sample to be excited.

In some embodiments, moving the stage is performed at an acceleration of 60 mm/s$^2$ until a maximum speed of 30 min/s is reached.

In some embodiments, an optical path of one of the three sub-pulses is adjusted by providing a stepper motor in the optical path of the sub-pulse, wherein the stepper motor is equipped with at least one reflector to allow the sub-pulse to be reflected on it; and adjusting a position of the stepper motor to adjust the optical path of the sub-pulse.

In some embodiments, the stepper motor is moved in a step of 0.001 mm.

In some embodiments, the beam splitting unit includes two beam splitters, and splitting the femtosecond laser pulse includes: splitting the femtosecond laser pulse into two primary pulses by one of the two beam splitters; and splitting one of the primary pulses into two secondary pulses by the other one of the two beam splitters.

In some embodiments, the femtosecond laser pulse has a wavelength of 800 nm, a repetition frequency of 1000 Hz, and a single-pulse laser energy of 2 mJ.

In some embodiments, the three sub-pulses have an equal energy.

In a second aspect of the present disclosure, a detection device based on laser-induced breakdown spectroscopy enhanced by a two-dimensional plasma grating includes: a femtosecond laser configured to generate a femtosecond laser pulse; a beam splitting unit configured to split the femtosecond laser pulse into three sub-pulses; a focusing unit configured to focus the three sub-pulses to allow focused sub-pulses to be overlapped at an intersection in space, wherein before reaching the intersection, the three sub-pulses form two planes; a time domain synchronization unit configured to adjust an optical path of each of the three sub-pulses in such a way that optical paths of the three sub-pulses have a same length and the three sub-pulses arrive at the intersection in space simultaneously and form the two-dimensional plasma grating; a stage for supporting a sample; and a spectrum collection unit configured to collect a spectrum signal emitted by sample excitation.

In some embodiments, the detection device includes a polarization adjustment unit configured to adjust a polarization direction of each sub-pulse.

In some embodiments, the polarization adjustment unit includes three half-wave plates, and each half-wave plate is arranged in an optical path of one of the three sub-pulses.

In some embodiments, the stage is an electronically controlled displacement stage composed of a stepper motor and a stage body, and is configured to move the sample to allow different regions of the sample to be excited.

In some embodiments, the stage has an acceleration of 60 mm/s$^2$ and a maximum speed of 30 mm/s.

In some embodiments, the time domain synchronization unit includes two time delay lines each provided with a stepper motor equipped with two reflectors.

In some embodiments, the beam splitting unit includes: a first beam splitter configured to split the femtosecond laser pulse into two primary pulses; and a second beam splitter configured to split one of the primary pulses into two secondary pulses.

In some embodiments, the spectrum collection unit includes: a lens or a 4f imaging system configured to converge fluorescence emitted from the sample; an optical fiber probe configured to collect a fluorescence signal; and a spectrometer configured to receive and analyze the fluorescence signal transmitted from the optical fiber probe.

In some embodiments, the detection device further includes a photodetector. The photodetector includes a high-speed photoelectric probe placed behind one reflector in the detection device before focusing the three sub-pulses, and is configured to collect few femtosecond signals to form a trigger signal and transmit the trigger signal to the spectrum collection unit.

BRIEF DESCRIPTION OF THE DRAWINGS

FIG. 1 is a schematic diagram of a detection device based on laser-induced breakdown spectroscopy enhanced by a two-dimensional plasma grating according to an embodiment of the present disclosure.

FIG. 2A is a schematic diagram of a one-dimensional plasma grating, and FIG. 2B is a schematic diagram of a two-dimensional plasma grating according to an embodiment of the present disclosure.

Figure 3:
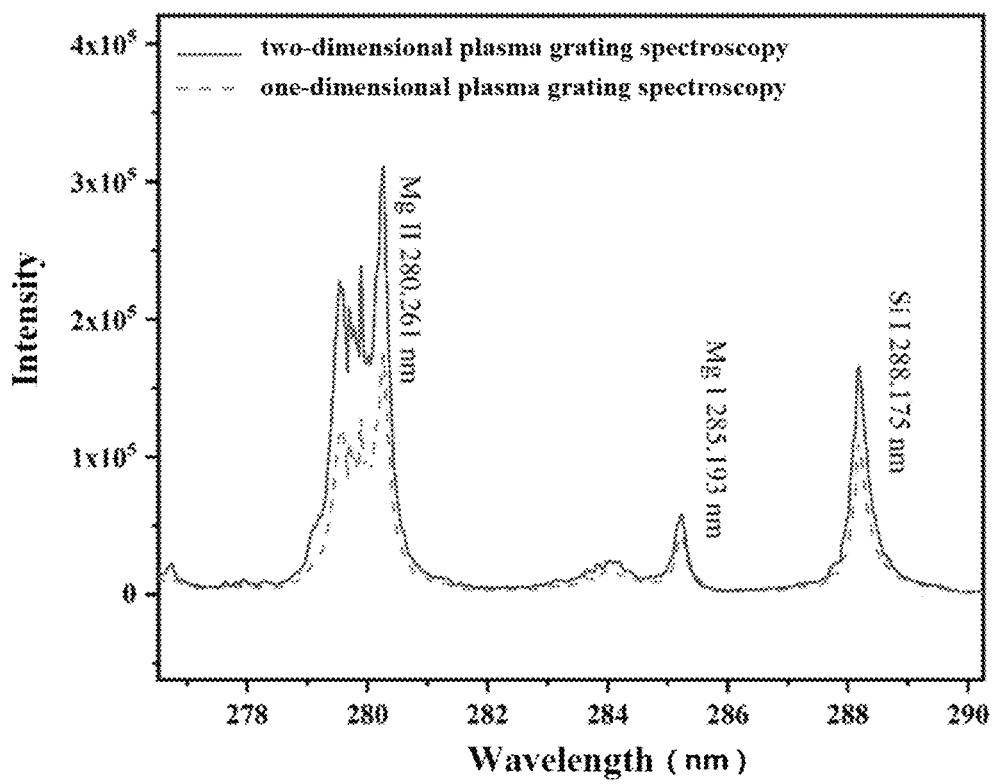
FIG. 3 is a graph showing spectrum results of a soil sample GSS-9 detected by LIBS based on a two-dimensional plasma grating according to an embodiment of the present disclosure and a one-dimensional plasma grating.

REFERENCE NUMERALS (1) femtosecond laser; (2) reflector A; (3) beam splitter A; (4) reflector B; (5) stepper motor A; (6) reflector C; (7) reflector D; (8) beam splitter B; (9) reflector E; (10) stepper motor B; (11) reflector F; (12) reflector G; (13) reflector H; (14) reflector I; (15) reflector J; (16) reflector K; (17) reflector L; (18) lens A; (19) lens B; (20) lens C; (21) three-dimensional sample stage; (22) electronically controlled shutter; (23) lens D; (24) photodetector; (25) spectrometer; (26) half-wave plate A; (27) half-wave plate B; (28) half-wave plate C; (29) computer A; (30) computer B.

DETAILED DESCRIPTION

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure. The embodiments shall not be construed to limit the present disclosure.

Embodiments of the present disclosure seek to solve at least one of the problems existing in the related art to at least some extent. Accordingly, the present disclosure provides in embodiments a detection device and method based on laser-induced breakdown spectroscopy enhanced by two-dimensional (2D) plasma grating. By applying the 2D plasma grating to the LIBS, problems of low detection sensitivity and the matrix effect in the existing LIBS technologies are solved.

The present disclosure provides the following technical solutions:

A detection device based on 2D-plasma-grating-enhanced LIBS includes a femtosecond laser, a beam splitting unit, a time domain synchronization unit, a focusing unit, an electronically controlled displacement stage, a photoelectric conversion unit, a spectrum collection unit, and a polarization adjustment unit.

The present detection method includes the following steps:

(1) generating a femtosecond laser pulse by the femtosecond laser and splitting the femtosecond laser pulse into a plurality of sub-pulses by the beam splitting unit, each sub-pulse having an energy higher than the energy threshold for forming a filament;

(2) focusing the plurality of sub-pulses by the focusing unit to allow the focused sub-pulses to be overlapped in space, the plurality of sub-pulses obtained in step (1) being three or more and forming at least two planes;

(3) adjusting the time domain synchronization unit to allow the plurality of the femtosecond optical filaments overlapped in space in step (2) to be synchronized in the time domain in such a way that the plurality of the sub-pulses arrive at a spatial intersection point simultaneously and form a two-dimensional plasma lattice grating through non-linear coupling;

(4) exciting a sample based on the two-dimensional plasma lattice grating formed in step (3) to generate a plasma cluster containing atoms, ions, or electrons of a substance to be tested, and collecting a fluorescence emitted from the plasma cluster and analyzing a spectrum of the fluorescence by the spectrum collection unit;

(5) adjusting a polarization direction of each sub-pulse by the polarization adjustment unit to achieve different degrees of interaction of the filaments to form different periodic structures of the plasma lattice grating, to achieve a better coupling with the sample and thus to optimize the excitation effect.

The beam splitting unit in step (1) includes a plurality of beam splitters. The femtosecond laser pulse may be split into multiple femtosecond laser sub-pulses with equal energy.

The focusing unit in step (2) includes a plurality of focusing lenses. There is an angle between any two femtosecond sub-pulses, and multiple focusing lenses with the same focal length are provided to focus different femtosecond pulses.

In some embodiments, an array lens can be used to focus one femtosecond pulse to form a one-dimensional plasma grating. On this basis, a plurality of one-dimensional plasma gratings obtained from the plurality of the sub-pulses may be interacted with each other to form a two-dimensional plasma grating with a relatively short cycle.

The time domain synchronization unit in step (3) includes a plurality of time delay lines. A stepper motor may be provided in a time delay line to adjust a length of an optical path of a light beam by adjusting a position of the stepper motor. In this way, the sub-pulses with the same pulse width in an order of femtoseconds can reach the overlapping region simultaneously.

In some embodiments, a stepper motor with a stepping accuracy of 0.001 mm is provided in the delay line, and the position of the stepper motor is adjusted by detecting and analyzing spectral signals changed as pulse delay changes. In the present disclosure, although the duration of the femtosecond laser pulse is extremely short, the femtosecond filament formed has a longer duration, and the time delay can be controlled in the order of ps.

The photoelectric conversion unit (i.e., a photodetector) includes a high-speed photoelectric probe, which may be placed behind any reflector before focusing and is configured to collect the very few femtosecond laser signals, and form a 3-5 V electrical trigger signal and transmit it to the spectrum collection unit.

The spectrum collection unit adopts a lens with a short focal length and a large area or a 4f imaging system to converge as much fluorescence emitted from the plasma cluster as possible on an optical fiber probe, and the optical fiber probe collects signal data and transmits the data into a spectrometer (through optical fibers) for analysis.

In some embodiments, the spectrometer is an Echelle spectrometer equipped with an intensified charge-coupled device (ICCD), which can well analyze the atomic spectrum ranging from 200 to 800 nm. For laser excitation with a high repetition frequency, integrate-on-chip mode is applied to increase a signal-to-noise ratio of a spectrum.

The electronically controlled displacement stage is a control system composed of a stepper motor and a stage, which can move the sample during the excitation of the sample with the two-dimensional plasma grating to excite different regions of the sample at the same excitation condition, and thus improve repeatability and stability of the detection.

The polarization unit includes a plurality of half-wave plates, and each half-wave plate is arranged in a location of an individual optical path after the beam splitting has been performed. In this way, different coherence degrees can be achieved to obtain the maximum spectrum signal.

In the present disclosure, the sample is excited by the two-dimensional plasma grating formed after the interaction of the multi-filaments in step (3), and the sample is excited by the actions of both the optical field of the two-dimensional plasma grating and electrons. Compared with the femtosecond filament or the one-dimensional plasma grating, under the same laser power, the two-dimensional plasma grating exhibits a two-dimensional lattice arrangement due to the nonlinear coupling of the multi-optical filaments, and has a higher power density and electron density. In this way, the sample may be excited adequately. By applying the two-dimensional plasma grating, not only common solids, liquids or gases can be excited but also laser ablated superhard materials and superstable oxides can be excited, thereby improving the spectrum signals and the detection sensitivity.

Since the pulse duration of the femtosecond is ultra-short, the 2D plasma grating has little effect on the plasma cluster generated after the excitation of the sample, thus avoiding the plasma shielding effect. On this basis, the spectrometer has an acquisition delay of 0-5 ns to obtain more spectrum information, and an acquisition gate width is set according to a lifetime of the generated plasma cluster, for example in a range of 100 to 500 ns. Meanwhile, the stronger excitation ability achieved by the 2D plasma grating not only improves the signal-to-noise ratio of the spectrum but also further overcomes the matrix effect, which can facilitate the quantitative analysis of different samples.

In addition, due to the nonlinear coupling between the femtosecond filaments, the overlapping region has a certain size, and the two-dimensional plasma grating has a certain length. In the plasma grating channel, the optical power density and electron density will be maintained stably. As long as the sample is placed in the region corresponding to the two-dimensional plasma grating, the excited spectrum signal has a stable intensity. On this basis, the influence of a change in the relative position of the sample with respect to a focal point is reduced, and the repeatability of the detection is improved.

In some embodiments, argon or neon is used as a gas atmosphere to further increase the power density and the electron density inside the two-dimensional plasma grating channel, and further enhance the spectral signal. The gas atmosphere may have a gas flow rate of 2 to 10 L/min.

Compared with the related art, the present disclosure has the following beneficial effects. With the present method or device, the two-dimensional plasma grating with a high power density and electron density is formed to excite the sample, which improves the detection sensitivity of the LIBS and reduces the matrix effect, thereby promoting the application of the LIBS in practical production activities, improving the speed and efficiency of the detection.

The present disclosure will be further explained with reference to the drawings.

FIG. 1 is a schematic diagram of a detection device based on laser-induced breakdown spectroscopy enhanced by a two-dimensional plasma grating according to an embodiment of the present disclosure.

As shown in FIG. 1, the beam splitting unit includes two beam splitters, i.e., a beam splitter A (3) and a beam splitter B (8). The beam splitter A (3) is a 1:2 beam splitter, and the beam splitter B (8) is a 1:1 beam splitter. The time domain synchronization unit includes two time delay lines. A first delay line includes a stepper motor A (5) provided with a reflector B (4) and a reflector C (6). A second delay line includes a stepper motor B (10) provided with a reflector D (9) and a reflector E (11). The stepper motors A and B have a movement accuracy of 0.001 mm.

With the present detection device as shown in FIG. 1, the detection method is performed as follows.

A femtosecond laser pulse with an energy of 1 to 2 mJ is generated by the femtosecond laser (1), reflected by a reflector A (2) to the beam splitter A (3), and divided by the beam splitter A (3) into a primary transmission light and a primary reflection light. About 0.02% of the laser light after the reflector A (2) is received by a photodetector (24) and converted into an electrical signal of 3-5 V, which is transmitted to the spectrometer (25) as a trigger signal.

The primary transmission light reaches the reflector B (4), the reflector C (6) and a reflector D (7), is reflected to the beam splitter B (8), and is divided by the beam splitter B (8) into a secondary transmission light and a secondary reflection light. The secondary reflection light propagates and reaches the reflector E (9) and the reflector F (11), and passes through a half-wave plate C (28) and is converged by a lens C (20) into a first filament. The secondary transmission light passes through a half-wave plate B (27) and reaches a reflector G (12), a reflector F (13) and a reflector H (14), and is converged by a lens B (19) into a second filament. The first filament and the second filament are intersected.

The primary reflection light passes through a half-wave plate A (26) and reaches a reflector J (15), a reflector K (16) and a reflector L (17), and is converged by a lens A (18) into a third filament which is intersected with the first and second filaments at the same time.

An optical path of the secondary reflection light is adjusted by the stepper motor B (10) to make it have the same optical length with the secondary transmission light, and thus the first and second filaments are synchronized in the time domain at the intersection. An optical path of the primary transmission light is adjusted by the stepper motor A (5) to make it have the same optical length with the primary reflection light, and thus the first, second and third filaments are synchronized in the time domain at the intersection. Therefore, the first, second and third filaments are intersected in space and synchronized in the time domain, and form the two-dimensional plasma grating.

The sample is placed on the three-dimensional displacement stage (21). A position of the sample is adjusted to allow a surface of the sample to be in the range of the two-dimensional plasma grating, and thus a spectral signal can reach the maximum intensity. For a solid sample, in order to ensure that each excitation based on the two-dimensional plasma grating can be performed on a different region of the surface of the sample, a timing control is set in such a way that after one pulse excitation is completed, the sample is moved to allow a different region of the surface to be excited by a next pulse.

Computer A (29) is used to realize a timing control of a shutter (22) and the three-dimensional displacement stage (21). The stage moves in a z direction (perpendicular to a direction of femtosecond pulse propagation) with an acceleration of 60 mm/s$^2$ and a maximum movement speed of 30 mm/s. An opening delay of the shutter (22) is 500 ms. On this basis, the stage is accelerated to the maximum speed first, and then the shutter is opened. An opening time of the shutter (22) is set to 0.3 s. It is ensured that the sample is excited by the laser through the two-dimensional plasma grating while the stage is kept at the maximum speed. After the excitation is complete, the shutter is closed and the stage decelerates until it is stopped.

After the sample placed on the stage is excited, plasma clusters containing atoms, ions and/or electrons of the substance to be tested are generated. The emitted light is converged by a lens D (23) and collected by the fiber probe, and transmitted to the spectrometer (25) through the optical fiber. The corresponding spectral data is acquired and analyzed by a computer D (30).

In an embodiment, a laser repetition frequency is 1000 Hz, and an integrate-on-chip mode of the spectrometer is applied to improve the signal-to-noise ratio of the spectrum signal. An exposure time is set to 0.1 s, and thus each spectrum obtained from accumulation of 100 excitations, which can effectively improve the signal-to-noise ratio of the spectrum signal. During signal acquisition, the acquisition delay and acquisition gate width may be adjusted. Since the sample is excited by the femtosecond laser, there will not be a strong background line in the early stage, so the acquisition delay can be set to 0 ns. A plasma lifetime generated by the excitation is in a level of hundred(s) of ns. The gate width is set in a range of 100 to 1000 ns.

The half-wave plates A, B and C are rotated to adjust polarization states of the three beams (different polarization states can achieve different degrees of the interference of the optical filaments), and also adjust a coupling efficiency between the sample and the optical filament. Therefore, the obtained spectrum signal is improved.

FIG. 2A is a schematic diagram of a one-dimensional plasma grating, and FIG. 2B is a schematic diagram of a two-dimensional plasma grating according to an embodiment of the present disclosure.

As shown in FIG. 2A, two beams are interacted to form the one-dimensional plasma grating, which is perpendicular to a cross-section of the plasma channel, and there is no power density clamping effect. As shown in FIG. 2B, the two-dimensional plasma grating is formed by three beams. The first beam corresponds to the laser pulse passing through the lens C in FIG. 1, the second beam corresponds to the laser pulse passing through the lens B in FIG. 1, and the third beam corresponds to the laser pulse passing through lens A in FIG. 1. As shown in FIG. 2B, the first beam and the second beam form a horizontal plane, and the second beam and the third beam form a vertical plane. The interaction of the three beams forms a plasma channel with a two-dimensional plasma grating structure. Compared with the one-dimensional plasma grating, the present plasma channel has a two-dimensional lattice structure, and the optical power density and electron density are improved.

In the present disclosure, the same sample can be detected by a single filament, the one-dimensional plasma grating, and the two-dimensional plasma grating under the same conditions. A lens with a focal length of 20 cm may be used for focusing. A distance between the lenses used in the one-dimensional plasma grating and the two-dimensional plasma grating may be 4 cm, an angle between the corresponding optical filaments may be about 10°, and the period of the plasma grating may be 4 µm.

Example 1

A standard soil sample GSS-9 was tested. After being fully dried, ground and refined, 0.3 g of powders were weighed and pressed with a hydraulic press at a pressure of 8 MPa for 2 min to obtain a soil tablet sample with a diameter of 13 mm for testing. A femtosecond laser pulse with a wavelength of 800 nm, a repetition frequency of 1000 Hz, and single-pulse laser energy of 2 mJ was used to excite the sample. The spectrometer was set with an acquisition delay of 0 ns and a gate width of 200 ns.

The sample is excited by the two-dimensional plasma grating and the one-dimensional plasma grating. FIG. 3 shows the obtained spectra. As shown in FIG. 3, compared with the spectrum acquired by the LIBS based on the one-dimensional plasma grating, the spectrum acquired by the LIBS based on the two-dimensional plasma grating is enhanced, for example, peaks of Mg II at 280.261 nm, Mg I at 285.193 nm and Si I at 288.175 nm have a higher intensity.

Example 2

A sludge sample was tested. After being fully dried, ground, and refined, 0.3 g of powders were weighed and pressed with a hydraulic press at a pressure of 8 MPa for 2 min to obtain a soil tablet sample with a diameter of 13 mm for testing. A femtosecond laser pulse with a wavelength of 800 nm, a repetition frequency of 1000 Hz, and single-pulse laser energy of 2 mJ was used to excite the sample. The spectrometer was set with an acquisition delay of 0 ns and a gate width of 500 ns.

Figure 4:
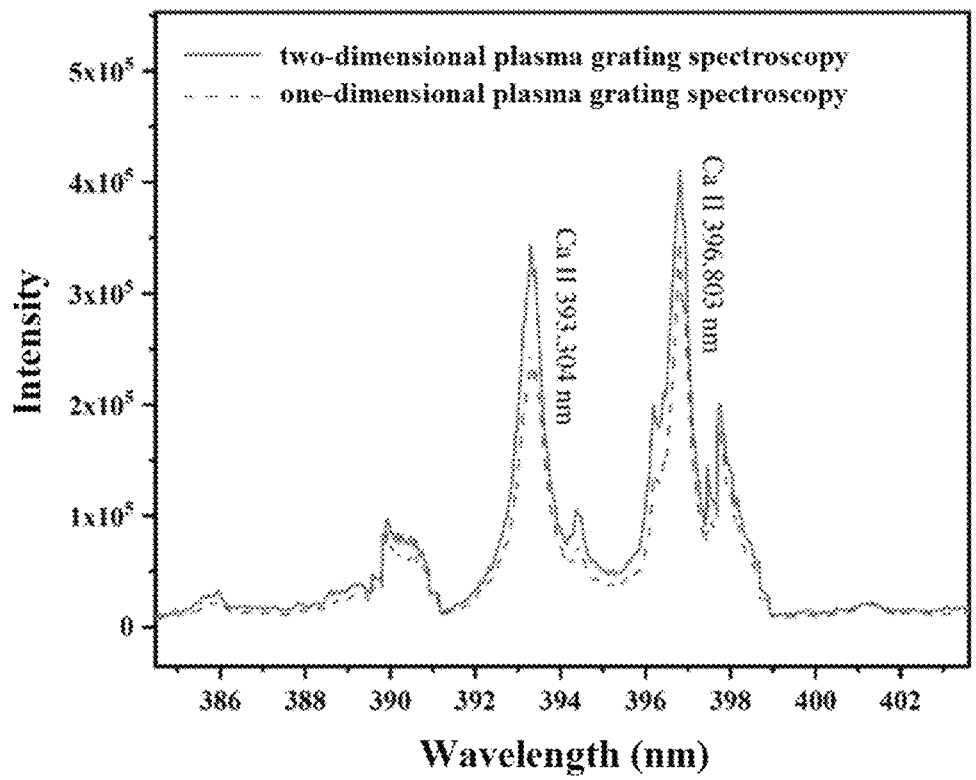
FIG. 4 is a graph showing spectrum results of a river sludge sample detected by LIBS based on a two-dimensional plasma grating according to an embodiment of the present disclosure and a one-dimensional plasma grating.

The sample is excited by the two-dimensional plasma grating and the one-dimensional plasma grating. FIG. 4 shows the obtained spectra. As shown in FIG. 4, compared with the spectrum acquired by the LIBS based on the one-dimensional plasma grating, the spectrum acquired by the LIBS based on the two-dimensional plasma grating are enhanced, for example, peaks of Ca II at 393.304 nm and Ca II at 396.803 nm have a higher intensity.

Example 3

Soil sample GW03121 was tested. Further, sub-samples added with Mn at a concentration of 6346 ppm, 12668 ppm, 18990 ppm, 31633 ppm, 37955 ppm, 44277 ppm, and 50599 ppm were prepared by incorporating $MnO_2$ after grinding and refining the soil sample. For each sub-sample, 0.3 g of powder was pressed with a hydraulic press at a pressure of 8 MPa for 2 min to obtain a soil tablet sample with a diameter of 13 mm for testing. A femtosecond laser pulse with a wavelength of 800 nm, a repetition frequency of 1000 Hz, and single-pulse laser energy of 2 mJ was used to excite the sample. The spectrometer was set with an acquisition delay of 0 ns and a gate width of 200 ns.

Figure 5A:
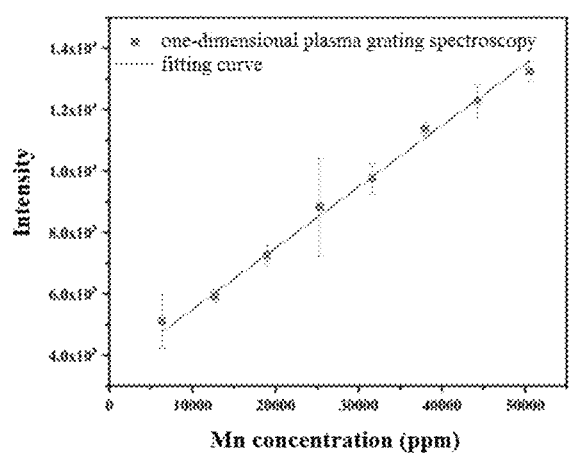
FIG. 5A is a graph showing a relationship between spectral intensity and Mn concentration detected by LIBS based on a one-dimensional plasma grating.
Figure 5B:
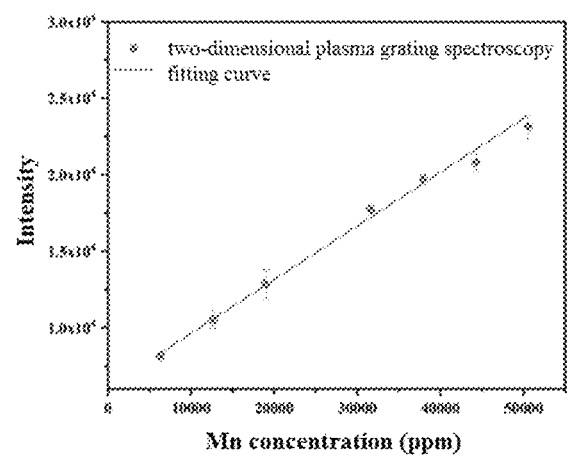
FIG. 5B is a graph showing a relationship between spectral intensity and Mn concentration detected by LIBS based on a two-dimensional plasma grating according to an embodiment of the present disclosure.

The samples are excited by the two-dimensional plasma grating and the one-dimensional plasma grating. FIG. 5A is a graph showing a relationship between spectral intensity and Mn concentration detected by LIBS based on a one-dimensional plasma grating, and FIG. 5B is a graph showing a relationship between spectral intensity and Mn concentration detected by LIBS based on a two-dimensional plasma grating according to an embodiment of the present disclosure. As shown in FIG. 5A and FIG. 5B, at the same Mn concentration, the spectrum signal acquired by the LIBS based on the two-dimensional plasma grating has a higher intensity than that acquired by the LIBS based on the one-dimensional plasma grating.

A detection limit has a formula of LOD=3σ/s, where σ is a standard deviation of the background noise of a spectrum, and s is a slope of a calibration curve. According to the detection limit formula, the detection limit of the heavy metal element Mn in the soil sample detected by the LIBS based on the two-dimensional plasma grating is 7.15 ppm. The detection limit is 14.82 ppm, when plasma-grating-induced breakdown spectroscopy (GIBS) is applied. Such a reduction in the detection limit indicates an increase in detection sensitivity.

In addition, terms such as "first" and "second" are used herein for purposes of description and are not intended to indicate or imply relative importance or significance or to imply the number of indicated technical features. Thus, the feature defined with "first" and "second" may include one or more of this feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from the scope of the present disclosure.

What is claimed is:

1. A detection method based on laser-induced breakdown spectroscopy enhanced by a two-dimensional plasma grating, comprising:
   generating a femtosecond laser pulse by a femtosecond laser, and splitting the femtosecond laser pulse into three sub-pulses by a beam splitting unit;
   focusing the three sub-pulses separately by a focusing unit to allow focused sub-pulses to be overlapped at an intersection in space, wherein before reaching the intersection, the three sub-pulses form two planes;
   synchronizing the three sub-pulses in a time domain by adjusting optical paths of the three sub-pulses in such a way that they have a same optical length and the three sub-pulses arrive at the intersection in space simultaneously and form the two-dimensional plasma grating; and
   exciting a sample on a stage based on the two-dimensional plasma grating to generate a plasma cluster, and acquiring a spectrum of the sample.

2. The detection method according to claim 1, further comprising:
   adjusting a polarization direction of each sub-pulse to control an interaction degree of the three pulses.

3. The detection method according to claim 1, further comprising:
   moving the stage to allow different parts of the sample to be excited.

4. The detection method according to claim 1, wherein moving the stage is performed at an acceleration of 60 mm/s$^2$ until a maximum speed of 30 mm/s is reached.

5. The detection method according to claim 1, wherein an optical path of one of the three sub-pulses is adjusted by:
   providing a stepper motor in the optical path of the sub-pulse, wherein the stepper motor is equipped with at least one reflector to allow the sub-pulse to be reflected on it; and
   adjusting a position of the stepper motor to adjust the optical path of the sub-pulse.

6. The detection method according to claim 5, wherein the stepper motor is moved in a step of 0.001 mm.

7. The detection method according to claim 1, wherein the beam splitting unit comprises two beam splitters, and splitting the femtosecond laser pulse comprises:
   splitting the femtosecond laser pulse into two primary pulses by one of the two beam splitters; and
   splitting one of the primary pulses into two secondary pulses by the other one of the two beam splitters.

8. The detection method according to claim 1, wherein the femtosecond laser pulse has a wavelength of 800 nm, a repetition frequency of 1000 Hz, and single-pulse laser energy of 2 mJ.

9. The detection method according to claim 1, wherein the three sub-pulses have equal energy.

10. A detection device based on laser-induced breakdown spectroscopy enhanced by a two-dimensional plasma grating, comprising:
    a femtosecond laser configured to generate a femtosecond laser pulse;
    a beam splitting unit configured to split the femtosecond laser pulse into three sub-pulses;
    a focusing unit configured to focus the three sub-pulses to allow focused sub-pulses to be overlapped at an intersection in space, wherein before reaching the intersection, the three sub-pulses form two planes;
    a time domain synchronization unit configured to adjust an optical path of each of the three sub-pulses in such a way that optical paths of the three sub-pulses have a same optical length and the three sub-pulses arrive at the intersection in space simultaneously and form the two-dimensional plasma grating;
    a stage for supporting a sample; and
    a spectrum collection unit configured to collect a spectrum signal emitted by sample excitation.

11. The detection device according to claim 10, further comprising:
    a polarization adjustment unit configured to adjust a polarization direction of each sub-pulse.

12. The detection device according to claim 11, wherein the polarization adjustment unit comprises three half-wave plates, and each half-wave plate is arranged in an optical path of one of the three sub-pulses.

13. The detection device according to claim 10, wherein the stage is an electronically controlled displacement stage composed of a stepper motor and a stage body, and is configured to move the sample to allow different regions of the sample to be excited.

14. The detection device according to claim 13, wherein the stage has an acceleration of 60 mm/s$^2$ and a maximum speed of 30 mm/s.

15. The detection device according to claim 10, wherein the time domain synchronization unit comprises two time delay lines each provided with a stepper motor equipped with two reflectors.

16. The detection device according to claim 10, wherein the beam splitting unit comprises:
 a first beam splitter configured to split the femtosecond laser pulse into two primary pulses; and
 a second beam splitter configured to split one of the primary pulses into two secondary pulses.

17. The detection device according to claim 10, wherein the spectrum collection unit comprises:
 a lens or a 4f imaging system configured to converge fluorescence emitted from the sample;
 an optical fiber probe configured to collect a fluorescence signal; and
 a spectrometer configured to receive and analyze the fluorescence signal transmitted from the optical fiber probe.

18. The detection device according to claim 10, further comprising:
 a photodetector comprising a high-speed photoelectric probe placed behind one reflector in the detection device before focusing the three sub-pulses, and configured to collect a few femtosecond signals to form a trigger signal and transmit the trigger signal to the spectrum collection unit.

* * * * *